W. Hunt,

Tire Upsetter.

No. 107,500. Patented Sep. 20, 1870.

Witnesses
M. Vorlaender
L. S. Mabee

Inventor
W. Hunt
per Munn & Co.
Attorneys

United States Patent Office.

WILLIAM HUNT, OF OSKALOOSA, IOWA.

Letters Patent No. 107,500, dated September 20, 1870.

---

IMPROVEMENT IN COMPOUND MACHINES FOR UPSETTING, PUNCHING, AND CUTTING METAL.

---

The Schedule referred to in these Letters Patent and making part of the same.

---

*To all whom it may concern:*

Be it known that I, WILLIAM HUNT, of Oskaloosa, in the county of Mahaska and State of Iowa, have invented a new and useful Improvement in Machine for Upsetting Wagon-Tire and other purposes; and I do hereby declare that the following is a full, clear, and exact description thereof, which will enable others skilled in the art to make and use the same, reference being had to the accompanying drawing forming part of this specification.

This invention relates to improvement in tire-upsetting machine, and consists in the upsetting mechanism, which includes a punch-die, and cutters that are detachable, and interchangeable one with another, as hereinafter set forth.

In the accompanying drawing—

Similar letters of reference indicate corresponding parts.

A is the bed-plate, which supports the entire apparatus. This bed may be made of either wood or metal, but a stiff piece of hard-wood plank is all that is required.

A' is a flanged head, which is bolted or fastened to the bed in any substantial manner.

Figure 1:
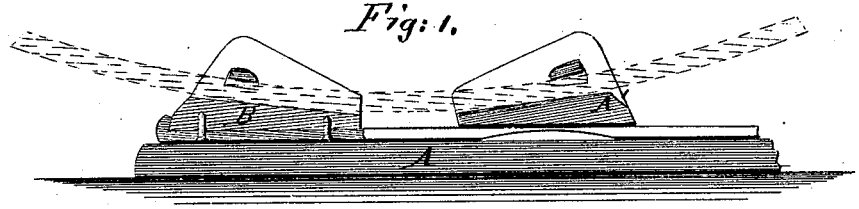
Figure 1 represents a sectional side elevation of the machine as applied to upsetting tire.
Figure 2:
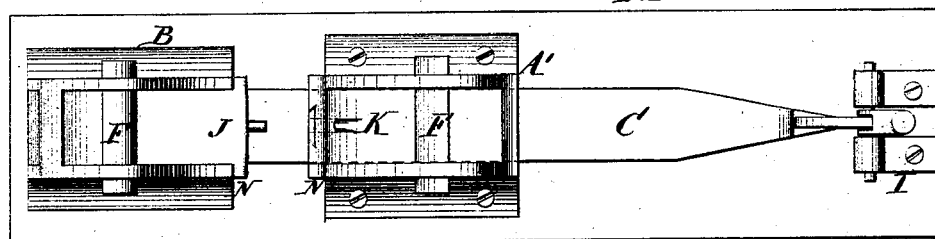
Figure 2 is a top view, showing a removable punch and die arranged on the machine for punching holes in iron.
Figure 3:
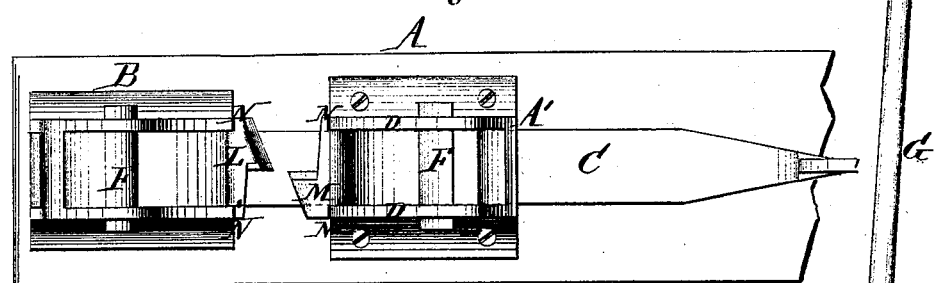
Figure 3 is also a top view, showing cutters arranged on the machine for cutting up small bars of iron for bolts or other purposes.
Figure 4:
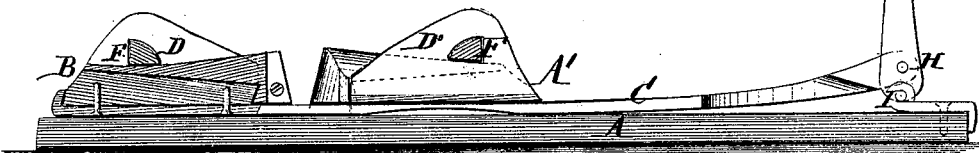
Figure 4 is a side view of fig. 3, partly in section.

B is a head of similar construction, which is movable, or made to slide on the bed by means of the bar C, to which it is attached, as represented in fig. 4.

Each of the heads are recessed out on their under sides to receive the bar C, so that the bar slides beneath the stationary head, while the movable head rests and slides on the bed.

D represents vertical flanges, (two on each head,) through which are triangular or other shaped key-holes E.

The space between the flanges is designed to be sufficient for the width of the tire, (say two inches, more or less,) and these inner surfaces incline toward each other, so as to correspond in some manner with the form of the tire.

For upsetting or making the tire smaller in diameter, so that it will properly fit the wheel when shrunken on, the tire is heated to a white heat in some parts, and is then placed on the heads between the flanges and fastened to the heads by the keys F, which pass through the holes E, with the heated portion of the tire between the keys.

The head B is now drawn toward the stationary head A by pulling on the lever G, to which the bar C is attached, as seen at the point H.

I is the fulcrum of the lever. The tire being securely fastened to each head with a heated portion between the heads, it will be seen that, when the powerful purchase obtained by the lever is brought to bear upon it, the heated portion must be upset, and the tire made less in diameter than it was before. It will be observed that the point of resistance is on a level with the point of connection H, so that the power is directly applied to the object in view.

J and K represent a punch and die, each with shanks, which rest between the flanges D, where they are fastened by the keys F.

L and M are cutters, fastened to the heads in the same manner, which operate as shears, to cut small bars of iron, the movable head B being operated by the lever, the same for punching and cutting as for upsetting.

N represents shoulders on the punch and die and on the cutters, which bear on the inner ends of the heads, which prevents any back motion when the power is applied.

Having thus described my invention,

I claim as new and desire to secure by Letters Patent—

Jointly, the tire-upsetting mechanism, consisting of the base A, heads A' and B, bar C, and lever G, and the punch and die J K, and pair of cutters L M, said punch and die and cutters being separate and detachable, applicable to the upsetting device, and interchangeable with one another, all substantially as described.

WILLIAM HUNT.

Witnesses:
 A. L. ELSWORTH,
 W. F. BERRY.